(12) United States Patent  
Bunker et al.

(10) Patent No.: US 9,091,903 B2  
(45) Date of Patent: Jul. 28, 2015

(54) OPTIMIZED MOVABLE IR FILTER IN CAMERAS

(75) Inventors: Philip Alan Bunker, Orem, UT (US); Mark Nelson, West Jordan, UT (US); Jeffrey B. Lancaster, Riverton, UT (US); Todd Webb, Alpine, UT (US); Ting Chia Hsu, Hsinchu (TW); Eva Tai, Hsinchu (TW)

(73) Assignee: Logitech Europe S.A., Lausanne (CH)

( * ) Notice: Subject to any disclaimer, the term of this patent is extended or adjusted under 35 U.S.C. 154(b) by 962 days.

(21) Appl. No.: 12/846,054

(22) Filed: Jul. 29, 2010

(65) Prior Publication Data

US 2012/0026325 A1     Feb. 2, 2012

(51) Int. Cl.  
*H04N 7/18* (2006.01)  
*H04N 5/33* (2006.01)  
(Continued)

(52) U.S. Cl.  
CPC ............ *G03B 11/00* (2013.01); *H04N 5/23245* (2013.01); *H04N 5/2254* (2013.01)

(58) Field of Classification Search  
CPC ........ G03B 11/00; G03B 21/24; G03B 21/42; G02B 21/16; G02B 21/0032; G02B 21/0076; G02B 23/2484; G02B 5/201; G02B 5/208; G02B 5/281; H04N 5/2226; H04N 5/2254; H04N 5/2256; H04N 5/23245  
USPC ......... 348/143, 148–150, 151, 155, 159, 164, 348/169, 342  
See application file for complete search history.

(56) References Cited

U.S. PATENT DOCUMENTS 6,639,629 B1     10/2003   Takayama et al.  
6,642,955 B1 *   11/2003   Midgley et al. ............... 348/164  
(Continued)

FOREIGN PATENT DOCUMENTS

CN     1434342     8/2003  
CN     1611974     5/2005  
(Continued)

OTHER PUBLICATIONS

"Day/Night Exchanger for Pixim Chipsets", Sunex Digital Imaging Optics, Sunex Inc., Retrieved on Nov. 11, 2010, Document Available at: <http://www.sunex.com/News/day_night_exchanger.htm>, 2 pages.

(Continued)

*Primary Examiner* — Emmanuel L Moise  
*Assistant Examiner* — Farzana Huq  
(74) *Attorney, Agent, or Firm* — Kilpatrick Townsend & Stockton LLP

(57) ABSTRACT

Embodiments of the present invention include a camera having two modes: a visible light imaging mode (day-mode) and an IR imaging mode (night-mode). In the visible light imaging mode, an IR filter is in line with the lens assembly. In the IR imaging mode, the IR filter is mechanically removed, and IR light is allowed to pass to the sensor. In one embodiment, in the IR imaging mode, IR lighting is provided by an IR LEDs on the camera to illuminate the scene. In one embodiment, the various components are chosen, balanced and optimized so that images captured using visible light and images captured using non-visible light are both in focus. In one embodiment, an algorithm determines when there sufficient visible light is present and when it is not, and thus determines when to switch the camera from one mode to another.

19 Claims, 13 Drawing Sheets

(51) Int. Cl.
*H04N 5/225* (2006.01)
*G03B 11/00* (2006.01)
*H04N 5/232* (2006.01)

(56) References Cited

U.S. PATENT DOCUMENTS

| | | | |
|---|---|---|---|
| 7,126,098 | B2 | 10/2006 | Nakamura |
| 7,446,813 | B2 | 11/2008 | Nakamoto et al. |
| 7,456,901 | B2 | 11/2008 | Jeong et al. |
| 7,463,302 | B2 | 12/2008 | Kobayashi |
| 7,619,680 | B1 | 11/2009 | Bingle et al. |
| 7,649,547 | B2 * | 1/2010 | Kogane et al. ............. 348/143 |
| 7,755,697 | B2 | 7/2010 | Hsu |
| 7,915,652 | B2 * | 3/2011 | Lee et al. ............. 257/291 |
| 7,973,284 | B2 * | 7/2011 | Chiang ............. 250/330 |
| 2002/0044212 | A1 * | 4/2002 | Hashimoto ............. 348/335 |
| 2002/0163585 | A1 * | 11/2002 | Machii et al. ............. 348/342 |
| 2003/0164895 | A1 | 9/2003 | Viinikanoja et al. |
| 2003/0169457 | A1 | 9/2003 | Yasuda |
| 2005/0083431 | A1 | 4/2005 | Tsutsumi |
| 2005/0101348 | A1 | 5/2005 | Wang |
| 2005/0104996 | A1 | 5/2005 | Makii |
| 2005/0128291 | A1 * | 6/2005 | Murakami ............. 348/143 |
| 2005/0285967 | A1 | 12/2005 | Suda |
| 2008/0266393 | A1 * | 10/2008 | Park ............. 348/143 |
| 2009/0161003 | A1 * | 6/2009 | Takahashi et al. ............. 348/360 |
| 2011/0228097 | A1 * | 9/2011 | Motta ............. 348/164 |
| 2011/0228399 | A1 * | 9/2011 | Ohnishi ............. 359/586 |

FOREIGN PATENT DOCUMENTS

| | | |
|---|---|---|
| CN | 1811511 | 8/2006 |
| DE | 2640950 | 3/1977 |
| DE | 100 28233 | 1/2002 |
| TW | 1244306 | 11/2005 |

OTHER PUBLICATIONS

Day/Night Exchanger, Sunex Digital Imaging Optics, Sunex Inc., 2010, 3 pages.

Logitech Invention Disclosure Form ID # 20050329 entitled: "Step Zoom Lens"; Technical disclosure booklet; Oct. 11, 2005, 3 pages, V.4, 3 pages, Stanford Engineering Library, Stanford, CA.

German Patent Application No. 10 2010 061512.9—Office Action issued by the German Patent and TradeMark Office on Feb. 22, 2013.

* cited by examiner

OPTIMIZED MOVABLE IR FILTER IN CAMERAS

BACKGROUND

1. Field of the Invention

The present invention relates generally to cameras, and more particularly to cameras for producing acceptable quality video data in varying lighting conditions.

2. Description of the Related Arts

One of the challenges for imaging capturing devices is to capture acceptable quality images in a variety of lighting conditions. Most image capturing devices are challenged by very low visible light or no visible light conditions.

Some conventional cameras have a "night mode" which can be used for capturing images in low light conditions. However, some of these conventional cameras simply increase the exposure time in the "night mode", so as to gather sufficient light in low light conditions. There are several problems with such cameras. For one thing, increase in the exposure time implies that it takes longer to capture each image. This can be unacceptable or undesirable in certain situations, such as in a security/surveillance camera where a delay in capturing an image can result in missed information. This can also be undesirable if a video stream is being captured, since this results in a lower frame-rate. Further, this solution alone still requires a certain amount of visible light to be present, and thus will not function in really low visible light or no visible light environments. Other conventional cameras may use other solutions which also suffer from several problems, and which again require at least a certain amount of visible light, and will not work in extremely low or no visible light environments.

There are some applications where it is critical to produce image (video and/or still) data all around the clock. One such application is a video surveillance camera system. In a 24 hour period, the lighting conditions change from night to day and then day to night again. Video surveillance cameras are often located in environments where the visible lighting is very low or non-existent at night time. It is therefore particularly difficult to produce good video in night conditions. Further, it is not desirable to use a visible light source on a surveillance camera—this may alert intruders, disturb neighbors, etc.

Some existing surveillance cameras have non-visible light sources, such as infra-red (IR) lighting using IR LEDs. IR lighting is invisible to the human eye, so the camera may remain stealthy, and will pose much less of a nuisance to the neighbors. However, such existing cameras have very big pixels so as to not have severe degradation of image quality when using IR. Thus such cameras have very poor resolution and thus produce poor quality images in many lighting environments, including when visible light is present.

IR light poses problems in normal (visible) lighting conditions. In normal lighting conditions, the lens and sensor (imager) in a camera are very sensitive to Infra-Red (IR) light. An imager is very sensitive to IR lighting because of the longer wavelength which penetrates deeper into the imager device substrate than visible light and washes the color out of the scene, creating a black and white picture. This is particularly problematic because in natural light, plenty of IR light is included with all the visible light.

In a cameras of high quality, images captured in adequate light (e.g., in the daytime) should look natural to the users with good color and sharpness, while at the same time images captured in low or no visible light conditions (e.g., night time without sufficient visible light) should also have acceptable quality. In cameras used in very low light scenarios or in no light scenarios (e.g., in a dimly illuminated environment or unlit environment at night), such as surveillance cameras, it is especially important that these cameras work well not only in brightly lit environments, but in such low light environments as well.

Thus there is a need for a camera that functions well not only in well-lit environments, but also in very low visible light or no visible light environments, and where the captured images remain in focus regardless of whether visible light is present or not. Further, it is desirable to have a camera that can function in a gamut of visible light environments, and can be switched from a sufficient visible light mode to an insufficient visible light mode in a simple and intuitive manner. Moreover, an algorithm is needed to determine whether the sufficient illumination with visible light is present and when it is not. Moreover, such a camera needs to have a compact form factor. Further still, such a camera needs to compensate for the different wavelengths and penetrating properties of visible and non-visible light.

SUMMARY

Embodiments of the present invention include a camera that functions well not only in well-lit environments, but also in very low visible light or no visible light environments, and where the image remains in focus regardless of whether visible light is used or non-visible (e.g., IR) light is used to capture the image. Further, a camera in accordance with an embodiment of the present invention can function in a gamut of visible light environments, and can be switched from a sufficient visible light mode to an infra-red light mode in a simple and intuitive manner. Moreover, an algorithm in accordance with an embodiment of the present invention determines when sufficient visible light is present and when it is not.

A camera in accordance with an embodiment of the present invention captures images using visible light when sufficient visible light is present, and captures images using non-visible (e.g., IR) light when sufficient visible light is not present. In one embodiment, such a camera includes an IR filter which blocks IR light. The IR filter and can be placed in front of the sensor, or be removed from in front of the sensor, as appropriate. Since visible light includes plenty of IR light, and since IR light does not lead to high quality images when visible light is also present, in one embodiment, the IR filter is used in the presence of visible light to prevent additional exposure of the images. That is, in the presence of sufficient visible light, IR light is blocked by an IR filter on the lens assembly in front of the sensor, thus preventing the IR light from reaching the sensor, while allowing visible light to reach the sensor. However, when this IR blocking filter is in place, low or no visible light conditions are problematic, as discussed above. Hence in one embodiment, the IR filter is removable from the lens stack. Thus when there is not a sufficient amount of visible light available, the IR filter is removed from the lens stack, so that IR light reaches the sensor, and the image is captured using IR light. In one embodiment, one or more IR light sources are used to provide the IR light. Turning on an IR light source preserves the low visible lighting in the environment. This is important in some situations. For example, in the context of a security camera, not altering the light environment is important so as to not alert intruders. Other examples may include watching a movie/TV in low light conditions, where additional visible light is not desirable to the user.

In accordance with an embodiment of the present invention, a camera has two modes: a visible light imaging mode (also referred to as "day-mode" or "sufficient visible light mode") and am IR imaging mode (also referred to as "night-mode" or "non-visible mode" or "insufficient visible light mode"). In one embodiment, in the visible light imaging mode, the IR filter is in line with the lens assembly, and/or is part of the lens stack in front of the sensor. In the IR imaging mode, the IR filter is mechanically removed from the lens stack, and IR light is allowed to pass to the sensor. In one embodiment, in the IR imaging mode, IR lighting is provided by an array of IR LEDs on the camera to illuminate the scene. These two modes allow the camera to function both when sufficient visible light is present, and when it is not, but other non-visible light (e.g., IR light) is (or can be made) available.

In one embodiment, the IR filter is rotatably coupled to a frame, so that it can be rotated in and out of a position in front of the sensor. Such a rotatable mechanism allows the IR filter to be removable, while still taking up very little space and thus allowing for a compact form factor of the camera. Also, in one embodiment, an aperture in the camera is such that it accommodates an f#2 lens and a ⅓" imager.

In one embodiment, the system is optimized so that images captured using both visible light and non-visible light are in focus. It should be noted that IR light and visible light have different properties which affect the optical configuration of the camera system. For example, IR light focuses at a different point behind the lens. Furthermore, at a micro level, the amount of penetration of the silicon in the sensor by the IR light is different than the penetration by visible light. In accordance with various embodiments of the present invention, several adjustments are made to account for these differences in properties. In one embodiment, the thickness of the IR filter is adjusted to compensate for the wavelength differences. In one embodiment, when non-visible (e.g., IR) light sources are provided, the wavelength of these light sources is appropriately chosen. In one embodiment, the thickness of the IR filter and wavelength of the IR light sources are both chosen appropriately to ensure that the images captured remain focused both when using visible light and using IR light. In one embodiment, several pixels are binned together to account for the different penetration properties of IR light.

In one embodiment, a user can determine when the visible light is insufficient (or sufficient), and remove (or place) the IR filter and/or turn on (or off) the IR light source(s). In one embodiment, an algorithm is used to determine when the visible light is insufficient to capture acceptable quality and speed images. In one such embodiment, the user is provided with this information, and the user can then decide whether or not to remove the IR filter and/or turn on the IR light source. In one embodiment, the results of the algorithm are used to automatically and seamless remove the IR filter and/or turn on the IR light source(s) without user intervention. In one embodiment, when the camera is in visible light imaging mode, the algorithm reads the registers of the sensor, and when the registers record less than a certain threshold, it is determined that sufficient visible light is not available. The camera is then switched to IR imaging mode. When in IR imaging mode, the algorithm assesses whether the image is in focus. When the image appears out of focus, a determination is made that sufficient visible light is present. In one embodiment, the image has to remain out of focus for a specified amount of time before the camera is switched into visible light imaging mode.

The features and advantages described in this summary and the following detailed description are not all-inclusive, and particularly, many additional features and advantages will be apparent to one of ordinary skill in the art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

BRIEF DESCRIPTION OF THE DRAWINGS

The invention has other advantages and features which will be more readily apparent from the following detailed description of the invention and the appended claims, when taken in conjunction with the accompanying drawings, in which:

DETAILED DESCRIPTION

Figure 1A:
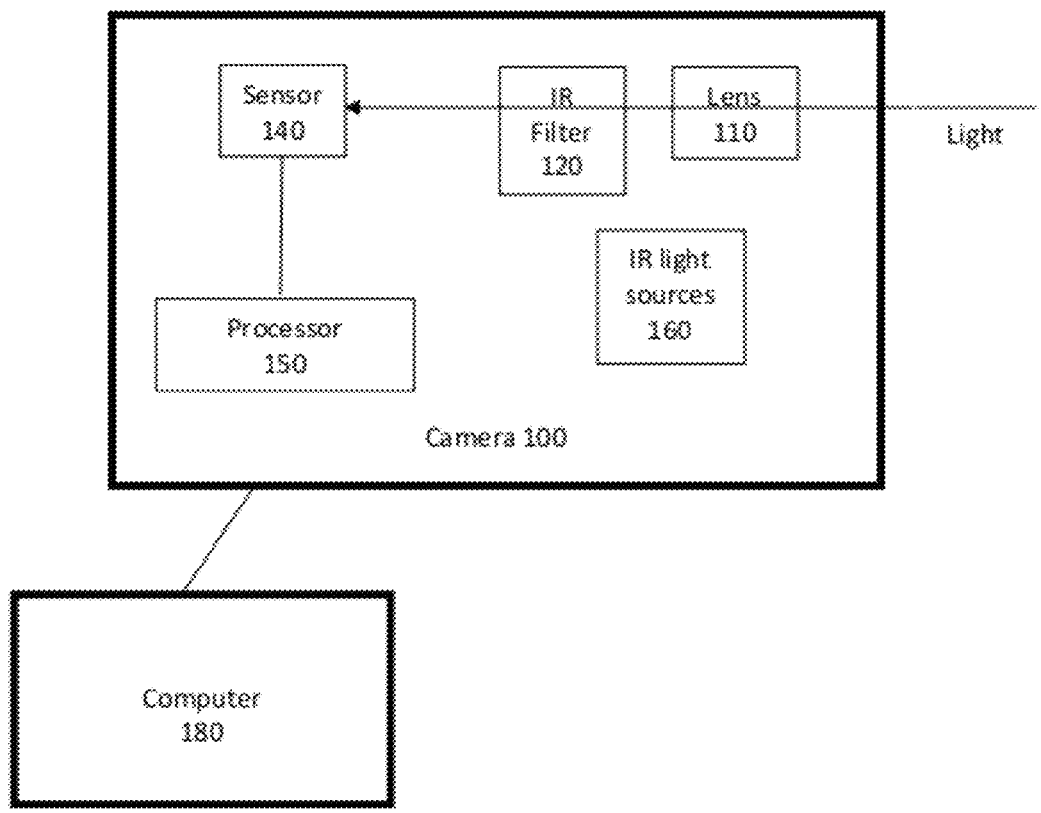
FIG. 1A shows a block diagram of a camera 100 in accordance with an embodiment of the present invention.
Figure 1B:
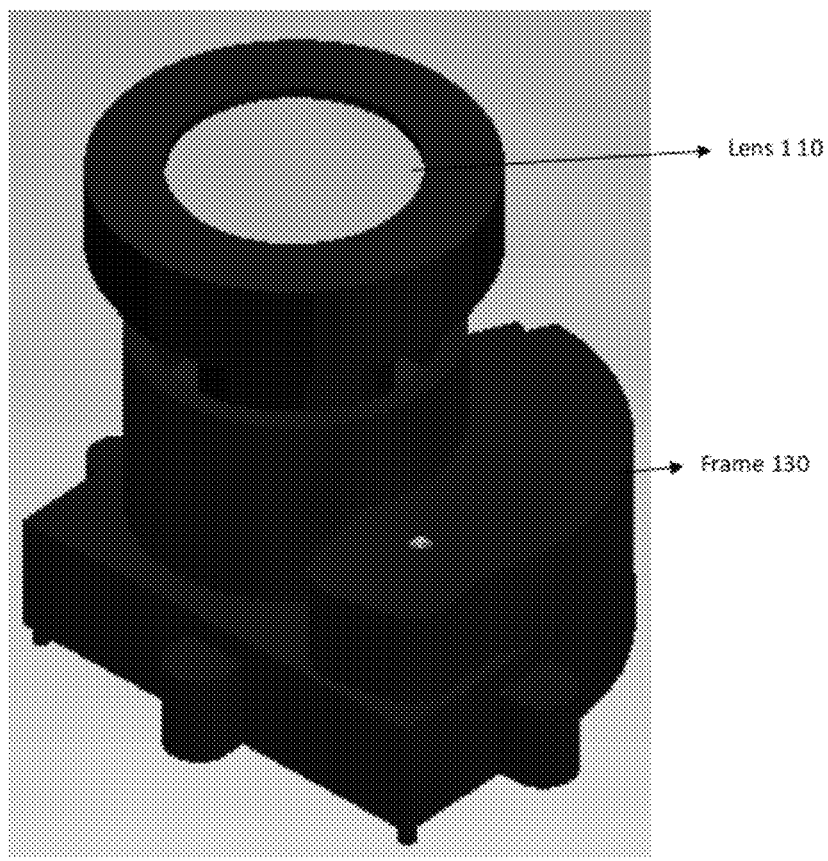
FIG. 1B shows a view of a camera in accordance with an embodiment of the present invention.
Figure 1C:
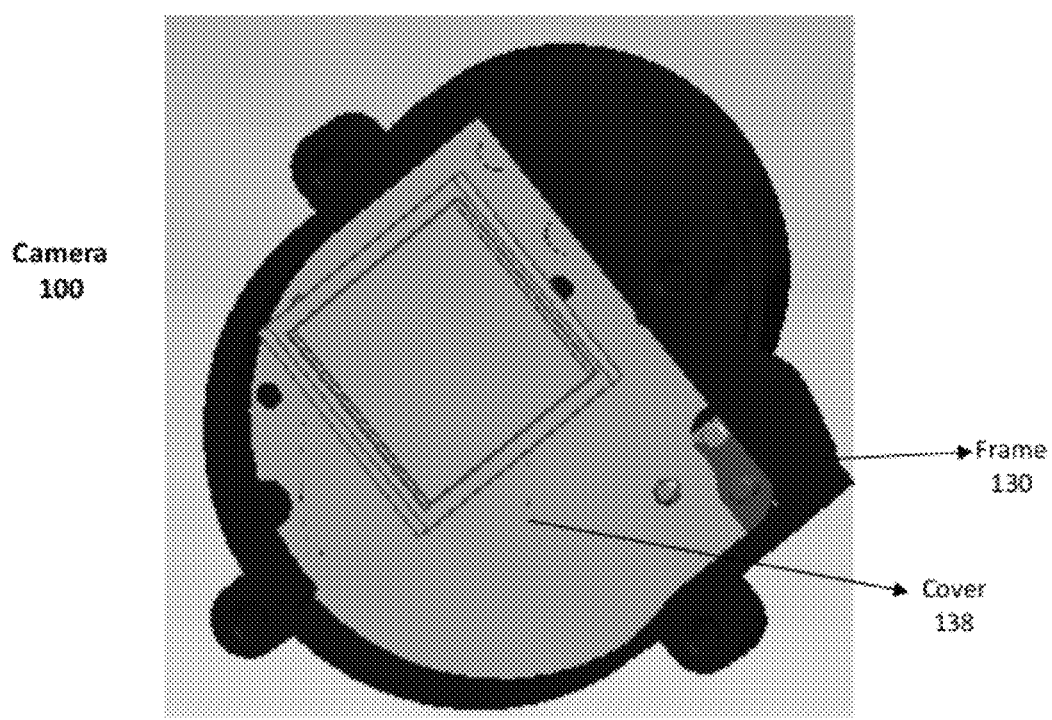
FIG. 1C shows another view of a camera in accordance with an embodiment of the present invention.

The figures (or drawings) depict embodiments of the present invention for purposes of illustration only. It is noted that similar or like reference numbers in the figures may indicate similar or like functionality. One of skill in the art will readily recognize from the following discussion that alternative embodiments of the structures and methods disclosed herein may be employed without departing from the principles of the invention(s) herein.

It is to be noted that the term "camera" refers here to any kind of image capture device. Such a device may capture video alone, still images alone, or both. Additionally, such a camera may also capture audio. Further, such a camera can be a stand-alone device, or be integrated into another device such as a smart phone, a cell phone, a personal digital assistant (PDA), a laptop, a tablet, a set-top box, a remote control, and so on. Further, such a camera may include all the required processors within the same physical device, or may communicate with processors located in other devices (such as the user's PC, remotely located servers, etc.). Also, the term "image" can refer to still images, video, or both.

It is also to be noted that while the use of IR light is discussed in several embodiments herein, other types of non-visible light (e.g., ultra-violet light etc.) may be used instead of, or in addition to, IR light, without departing from the scope of the present invention. Furthermore, it is also possible to use other types of electro-magnetic radiations in keeping with the scope of various embodiments of the present invention (e.g., microwaves, X-Rays, gamma rays, etc.)

One example where embodiments of the present invention are useful is in security/surveillance cameras. In security/surveillance settings, dimly lit or unlit environments at night are common. Also, in such applications, illuminating the scene for capture with visible light is often not a viable option. This may be for various reasons. For instance, such visible light in a residential neighborhood may be a disturbance to neighbors. Also, such visible light may unnecessarily alert an intruder that video recording is in progress. Further, in such video surveillance environments, it is often very important to continue to capture image information in an uninterrupted manner, regardless of the lighting conditions.

Another example where embodiments of the present invention are useful when the user is watching a movie/TV etc., and he/she does not desire much visible light. For instance, a user may have dimmed the lights to watch some content on his computer or his TV (in the family room or living room), and while doing so, receives a video call. This video call may progress in a picture-in-picture type implementation, where the video call proceeds in a window while the content being watched continues in another window. Alternately, the user may pause the content and take the video call, but may still not want to increase illumination levels in the room. In still another scenario, the user may wish to share the content being watched over a video call. Still other examples include military applications and scientific applications. It is to be noted that the above are only examples of scenarios where embodiments of the present invention can be used, and that the embodiments of the present invention are in no way limited to these examples.

Optimized Movable IR Filter

FIG. 1A shows a block diagram of a camera 100 in accordance with an embodiment of the present invention. The camera includes a lens 110, an IR filter 120, a sensor 140, a processor 150, and IR light sources 160.

The lens 110 can be any device which collects light and directs it to the sensor 140. The lens can be a single lens or can be made up of several lenses (a lens stack). In one embodiment, the lens 110 is a f#2 lens.

One aspect of some embodiments of the present invention relates to the IR filter 120 being placed in front of (i.e., in between the sensor and the object/scene being imaged/recorded), and removed from in front of the sensor 140. When the IR filter 120 is placed in front of the sensor, it blocks IR light from reaching the sensor 140. The sensor 140 receives visible light and an image is captured based on this received visible light. However, when the IR filter 120 is not in front of the sensor 140, IR light can reach the sensor 140. This is typically done when the visible light present is not sufficient to produce an image of acceptable quality.

In one embodiment, the IR filter 120 is made up of a glass substrate. In one embodiment, the glass substrate is coated with a material which blocks IR light. The IR filter 120 is added to, or removed from, the lens stack as appropriate. In one embodiment, more than one filter may be used, and/or the filter may be a combination of various filters, lenses, etc. The specifics of choosing the IR filter 120 to optimize the camera 100 to keep captured images in focus regardless of whether visible light or IR light is used to capture them, are discussed below.

The sensor or imager 140 can be any sensor, such as a CCD sensor, a CMOS sensor, a VGA sensor, a high resolution sensor (e.g., HD sensor), etc. In one embodiment, the sensor 140 is a ⅓" imager.

The processor 150 can be any processor that has the intelligence needed to perform the required processing.

In one embodiment, one or more IR light sources 160 are included. These IR light sources 160 are turned on to produce IR light. In one embodiment two powerful IR light sources provide IR illumination for up to a 30 feet radius. In one embodiment, these IR light sources 160 are incoherent light sources such as LEDs. In one embodiment, the IR light sources 160 are coherent light sources such as lasers. The wavelength of the light sources 160 used is selected, in one embodiment, to optimize the camera 100 to ensure that the images captured remain in focus regardless of whether visible light or IR light is used to capture the images. In particular, in one embodiment, the IR light sources are chosen so as to compensate for the thickness of the IR filter 120 and other factors, so that the IR light is ultimately focused on the sensor. There is further discussion on this below. For instance, the wavelength of IR light varies from about 800 nm to a 1000 nm, and so wavelengths in this range are chosen appropriately, in conjunction with the thickness of the IR filter chosen (as discussed below). In one embodiment, an LED of 850 nm is used as an IR light source 160. As mentioned above, if a different type of electro-magnetic radiation is used, the wavelength will be chosen appropriately from the appropriate available range.

In one embodiment, visible light sources (not shown) may also be included. In one embodiment, camera 100 is communicatively coupled to a computer 180. This is discussed in more detail with reference to FIG. 8.

Figure 1D:
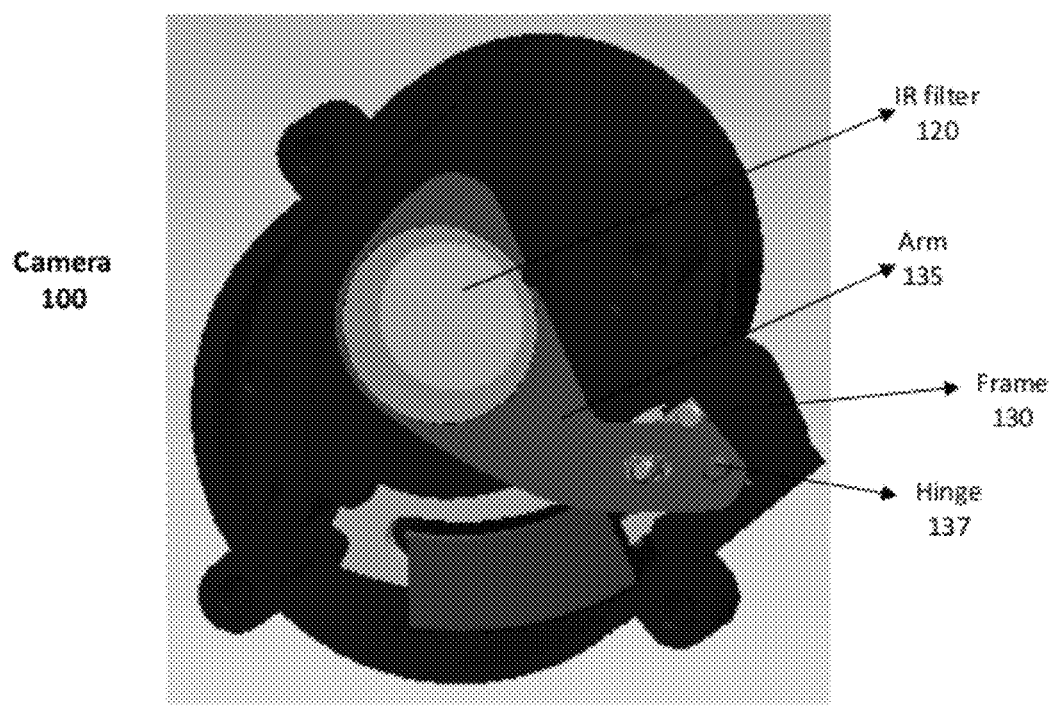
FIG. 1D shows another view of a camera in accordance with an embodiment of the present invention.
Figure 1E:
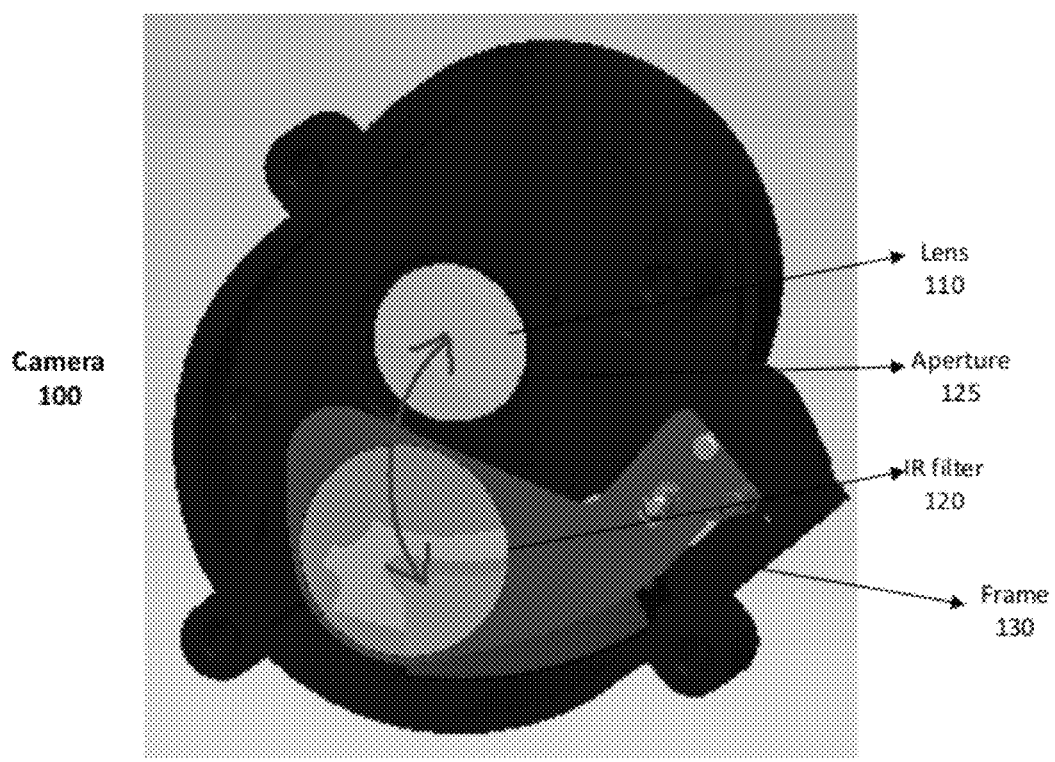
FIG. 1E shows another view of a camera in accordance with an embodiment of the present invention.

FIGS. 1B-1E are various views of a camera 100 in accordance with an embodiment of the present invention. It can be seen that such a camera includes a lens 110, a sensor (not shown), and an IR filter 120. In the embodiment shown, the IR filter 120 is on an arm 135, which is rotatably coupled to a frame 130 of the camera. Such a rotatable coupling can be done using any means such as a hinge 137. In one embodiment, the lens 110 is mounted in this frame. In another embodiment, the lens 110 is mounted in a different frame from the one to which the IR filter is rotatably coupled. In some embodiments, a cover 138 protects various elements in the camera 100 from foreign elements, dust particles, etc. FIG. 1D shows the IR filter 120 in a first position, where it is in between the sensor and the object/scene being imaged, while FIG. 1E shows the IR filter 120 in a second position, where it is not in between the sensor and the object/scene being imaged.

The rotatable coupling of the IR filter 120 allows for a very compact form factor of the camera 100. In one embodiment, a linear movement of IR filter 120 is possible, but this requires more space.

One or more of these functions (e.g., removal or placement of the IR filter, turning on or off of the IR light sources etc.) can be done manually by the user in accordance with an embodiment of the present invention, using a switch, a lever, or some such other mechanism. In one embodiment, the user may use a software selection to control these functions. In one embodiment, one or more of these functions are done electronically/automatically. In one such embodiment, an algorithm underlies the determination of when it is appropriate to place or remove the IR filter 120, turn the IR sources 160 on and/or off, etc. Details regarding one such algorithm are discussed below. In one embodiment, one or more of these functions can be implemented automatically and/or by user selections. In one such embodiment, this can depend upon a mode chosen by the user, and so on.

While the embodiments shown here show the IR filter 120 being placed between the lens 110 and the sensor 140, in other embodiments the IR filter 120 is in front of the lens 110—that is, between the lens 110 and the object being imaged.

In one embodiment, a camera 100 in accordance with an embodiment of the present invention has two modes—a visible light imaging mode (also referred to as "day-mode" or "sufficient visible light mode") and an IR imaging mode (also referred to as "night-mode," "non-visible mode" or "insufficient visible light mode"). In the visible light imaging mode, the IR filter 120 is in line with the lens assembly 110, and/or is part of the lens stack in front of the sensor. In the IR imaging mode, the IR filter 120 is mechanically removed from the lens stack 110, and IR light is allowed to pass to the sensor 140. In one embodiment, in the IR imaging mode, IR lighting is provided by an array of IR LEDs 160 on the camera to illuminate the scene. These two modes allow the camera to function both when sufficient visible light is present, and when it is not, but IR light is (or can be made) available.

In one embodiment, the lens 110, IR filter 120 and sensor 140 are mounted within an aperture 125 in the frame 130. The aperture 125 is sized in one embodiment to accommodate an f#2 lens and a ⅓" imager.

In some embodiments, in a camera 100 in accordance with some embodiments of the present invention, the different properties of visible light and IR light are taken into account, to optimize the camera 100 by ensuring that the camera 100 captures acceptable quality images using both visible light and IR light.

There are two main aspects affecting image capturing in which IR light is different from visible light. The first is the difference in wavelength between visible light and IR light. Visible light, which is typically comprised of violet through red colored wavelengths, has much shorter wavelength than IR light. The second aspect is that IR light penetrates much further into the silicon in the sensor than does visible light. While it may be relatively easy to take into account some of these optical properties and design a camera that works with either only visible light or only IR light, each of these aspects make it challenging to have a camera 100 that functions adequately using both visible light and IR light. Each of these aspects is discussed in detail now.

Figure 2:
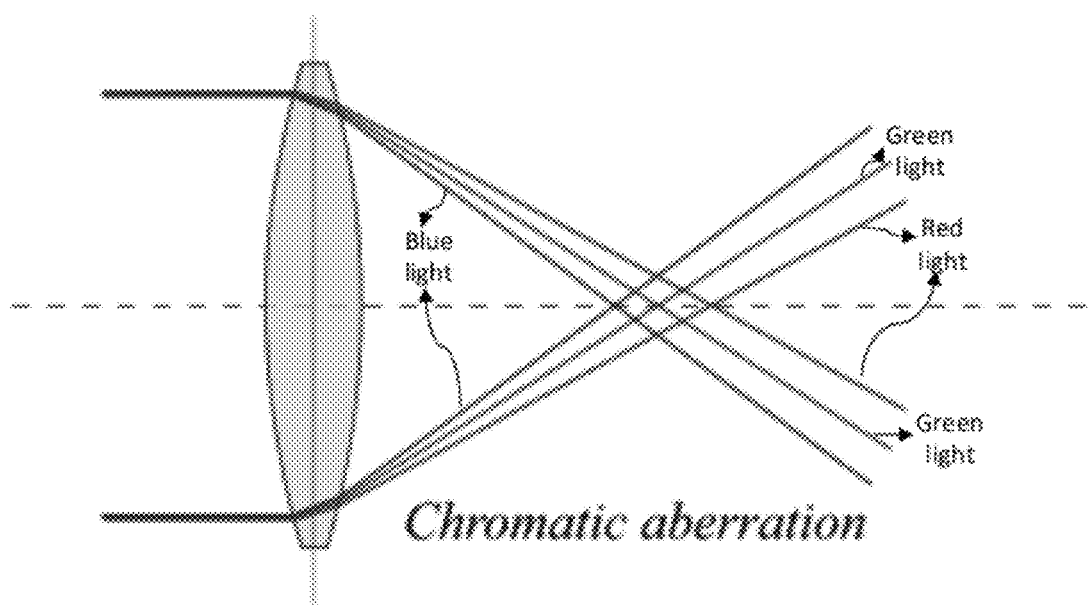
FIG. 2 illustrates chromatic aberration.

FIG. 2 illustrates chromatic aberration. This figure shows how light of each wavelength has a different focal length, and therefore focuses a different distance behind the same lens. FIG. 2 shows red, green and blue visible light. As can be seen from Table 1, the wavelengths of different colored lights even within the visible spectrum are quite different.

TABLE 1

| Color | Wavelength (nm) |
|---|---|
| Red | 650 |
| Green | 530 |
| Blue | 460 |
| IR | 850-1000 |

Some camera lenses are optimized for red, green and blue visible wavelengths. In some cases, the lens is made up of a six element glass lens stack that gives very good resolution at visible wavelengths. Such lenses are designed to bring the focal planes of the three primary visible colors as close as possible, and hence work well with visible light. However, as can be seen from Table 1, the wavelengths of IR light are much longer than even that of visible red light, and so steps need to be taken in order to focus the IR light at the same place (on the sensor) as visible light.

Figure 3A:
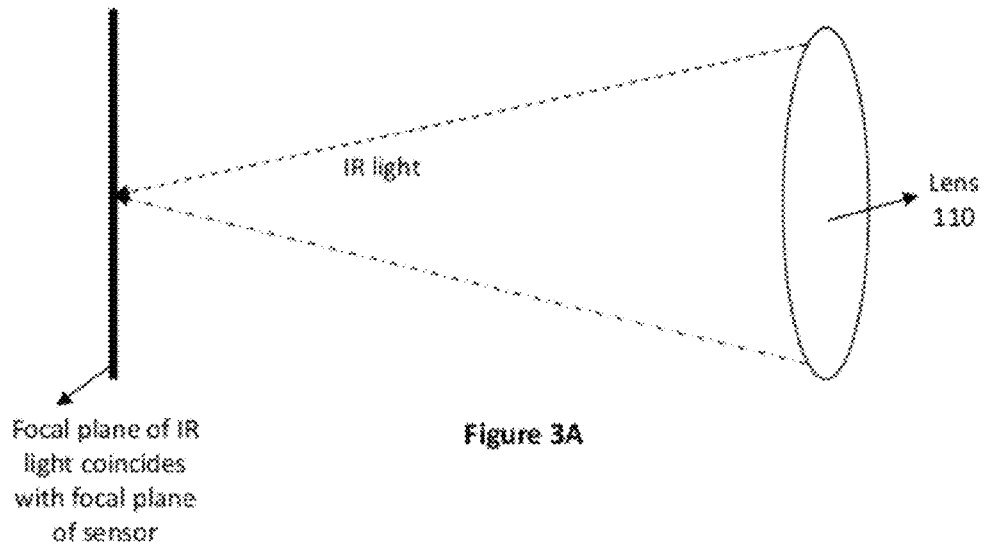
FIG. 3A shows IR light being focused onto a sensor.
Figure 3B:
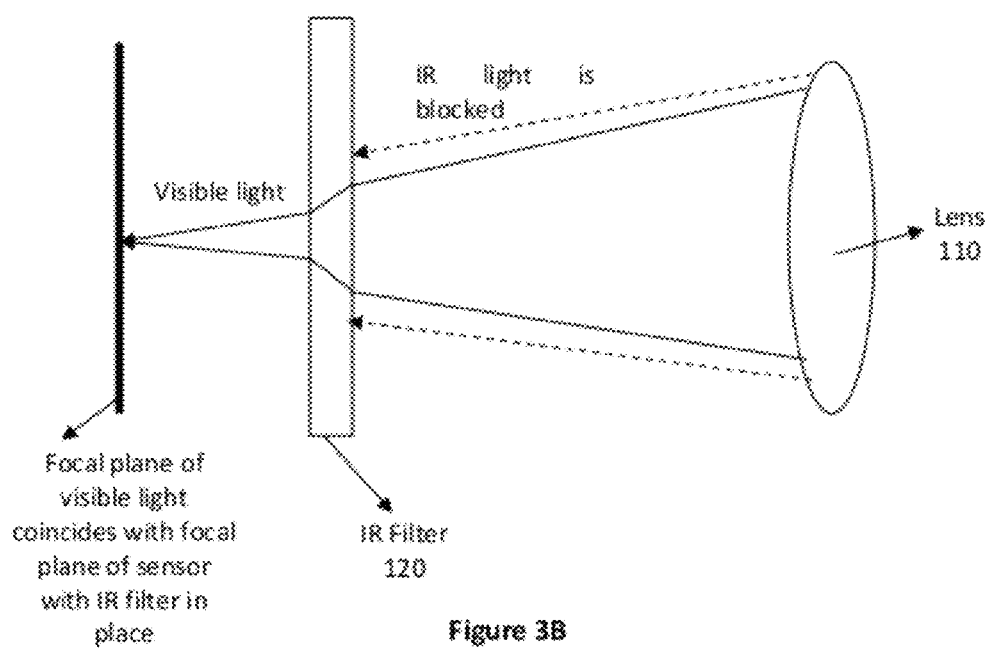
FIG. 3B shows visible light being focused onto a sensor with an IR filter in place.
Figure 3C:
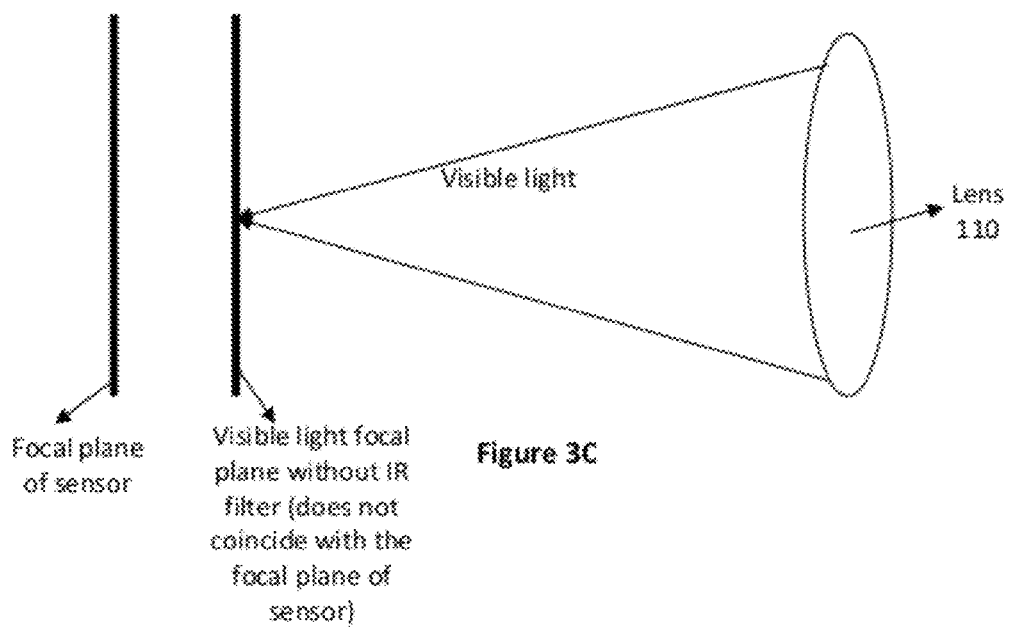
FIG. 3C shows that visible light is out of focus on the sensor without an IR filter in place.

In accordance with different embodiments of the present invention, there are many ways in which a system in accordance with an embodiment of the present invention is optimized so that an image created using IR light and an image created using visible light are both capturable in focus by the sensor. Further, it is to be noted that any of the below ways can be combined with any of the described or other techniques in order to accomplish this. FIG. 3A shows IR light (dotted lines) being directed by a lens 110 onto the focal plane of the sensor 140. In this figure, there is no IR filter in front of the sensor 140. FIG. 3B shows visible light being directed by the lens 110. In FIG. 3B, the IR light is blocked by the IR filter 120. The IR filter 120 refracts the visible light entering it as well as the visible light exiting it, and ensures that the visible light is focused at the focal plane of the sensor 140. Had the IR filter 120 not been present, visible light would not be focused at the focal plane of the sensor, as shown in FIG. 3C.

In one embodiment, the thickness of the IR filter 120 is chosen to be the correct thickness to compensate the focus of the visible light, so that the visible light focal plane matches the IR light focal plane with the IR filter 120 in front of the sensor. A filter is, in one embodiment, a coating on a substrate (like glass). (In one embodiment, impurities in the substrate (such as glass) provide filtering instead of, or in addition to, the coating.) The substrate thickness is chosen to provide the suitable optical path length shift to make visible light focus at the same distance as the IR light.

In one embodiment, the wavelength of the IR light source 160 is also chosen appropriately, so that visible light focuses on the sensor 140 with the IR filter 120 in front of it, and IR light focuses on the sensor 140 without the IR filter 120 in front of it. As shown above in Table 1, IR light has a range of wavelengths from about 800 nm to about 1000 nm. In one embodiment an IR light source with a wavelength of 850 nm is used. In another embodiment, an IR light source with a wavelength of 950 nm is used.

Figure 4:
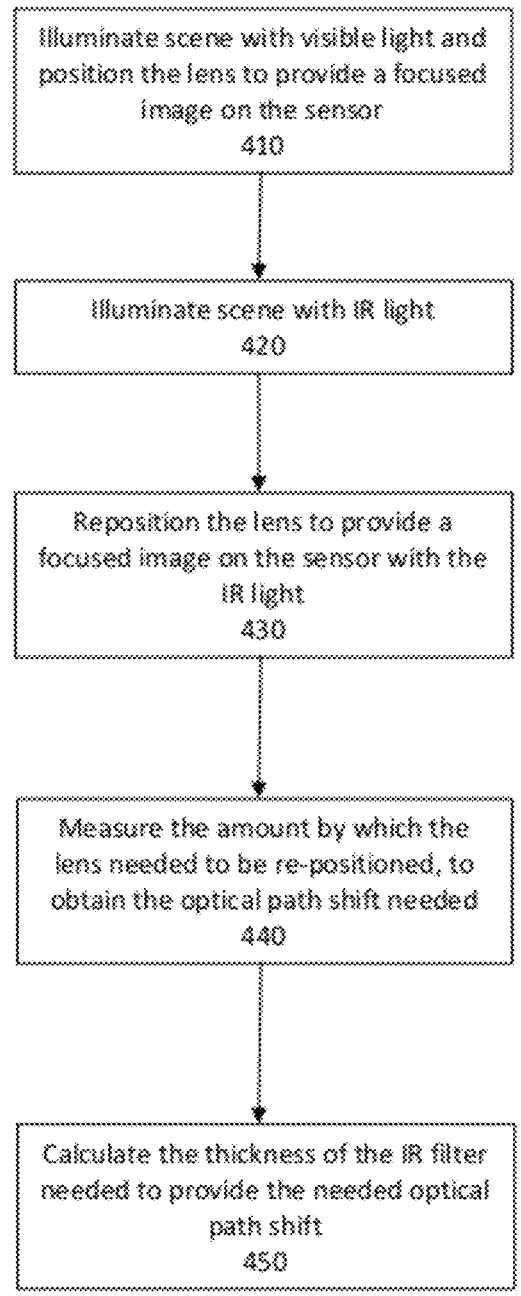
FIG. 4 is a flowchart that shows how the camera is optimized in accordance with an embodiment of the present invention.

FIG. 4 is a flowchart that shows how the camera 100 is optimized in accordance with an embodiment of the present invention. In one embodiment, the focal path shift is determined by illuminating a scene with visible light and focusing the lens to obtain a focused image on the sensor (step 410), and then illuminating the same scene with only IR light from the IR light source (step 420) and repositioning the lens to obtain a focused image on the sensor again (step 430). Measuring the amount of repositioning of the lens needed indicates the shift in the focal path length when going from visible light to IR light (step 440). In one embodiment, the lens is threaded, and this repositioning is measured by seeing how much rotation to the threaded lens is required to bring the IR scene to match the focus of the visible light scene. The thread pitch is known, and so the optical/focal plane shift can be accurately calculated. The thickness of the IR filter to provide the requisite focal plane shift can then be calculated (step 450). In one embodiment, this thickness of the IR filter 120 is calculated based upon knowing the index of refraction of the substrate. In one embodiment, the IR light source is chosen to account for the change in focal length. The various components are chosen, in one embodiment, to provide an optimized camera 100 which captures in-focus images with both visible light and IR light.

In accordance with an embodiment of the present invention, various components such as the sensor 140, lens assembly 120, IR filter 110, and the effects of IR illumination (IR light sources 160) are tuned and balanced so that the scene remains in focus whether the camera is operating using visible light or IR light.

Figure 5:
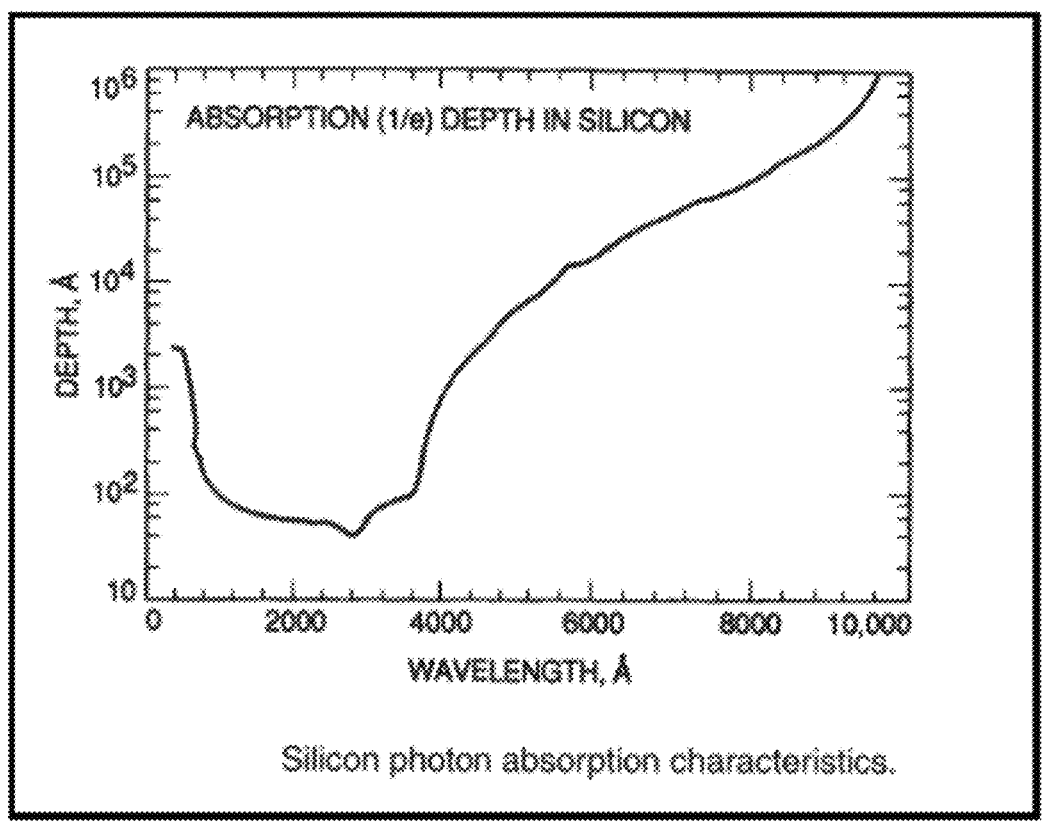
FIG. 5 illustrates that the absorption depth in the silicon of the imager varies with wavelength.

Let us now turn to the second aspect discussed above, relating to the IR light penetrating much further into the silicon in the sensor than visible light. The absorption depth in the silicon of the imager varies with wavelength. This is illustrated in FIG. 5. Short wavelength (high energy) light like blue (4600A) is usually absorbed within the first few microns or less of the silicon. For some CCD sensors, blue light does not even get to the silicon, since the gates of the CCD sensor absorb the energy before the photons even get to the collection zone.

In contrast, IR photons travel much deeper (up to 15 microns) into the silicon before they generate electrons. Once the electrons are generated, a cloud of electrons is usually created. This cloud of electrons is naturally repulsive (since like charges repel), and so the electrons spread as they travel to the collecting electrodes where they are captured for readout. The spreading of the electron cloud in the silicon is called "space charge broadening." A cloud of electrons may be around 15 microns in diameter by the time they are captured. In one embodiment, this is roughly 6 pixels in diameter from a focused IR scene. This causes a blurriness or degradation of the Modulation Transfer Function (MTF) that is wavelength dependent. (The MTF is a measure of how well the imager can reproduce a scene and how fine a detail in the scene can be resolved.)

Imagers with bigger pixels have better IR imaging performance, since bigger pixels suffer less from space charge broadening. Most VGA image sensors are typically 5.8 micron pixels, which make them superior to high resolution smaller pixels when capturing images using IR light. Thus a VGA image sensor is used in a camera in accordance with one embodiment of the present invention. In one embodiment, a high resolution sensor (e.g., an HD sensor) with small pixels is used. In one such embodiment, these very small pixels are "binned" to create super pixels. Binning is very useful, especially for low light applications, and is very useful in improving IR imaging performance in general, and particularly in improving IR MTF. In one embodiment, binning is turned on in the IR imaging mode and turned off in the visible light imaging mode. In one embodiment, turning binning on/off is selectable by software. In another embodiment, a user can do this.

In some embodiments, the sensor/imager is made with different materials (other than silicon) which have different penetration properties.

Algorithm for Determining when to Use IR Light for Imaging:

In accordance with an embodiment of the present invention, an algorithm is used to determine when visible light is to be used for capturing images and when non-visible radiation (e.g., IR light) is to be used. In one embodiment, such an algorithm is used to determine when to switch a camera from visible light imaging mode into IR imaging mode and back again. One such algorithm is based on the premise that when sufficient visible light is available, visible light should be used to capture images, since images captured using visible light are generally preferable to users. However, when visible light is not sufficient, (e.g., outside at night without visible light illumination), then IR light is used to capture images.

Figure 6:
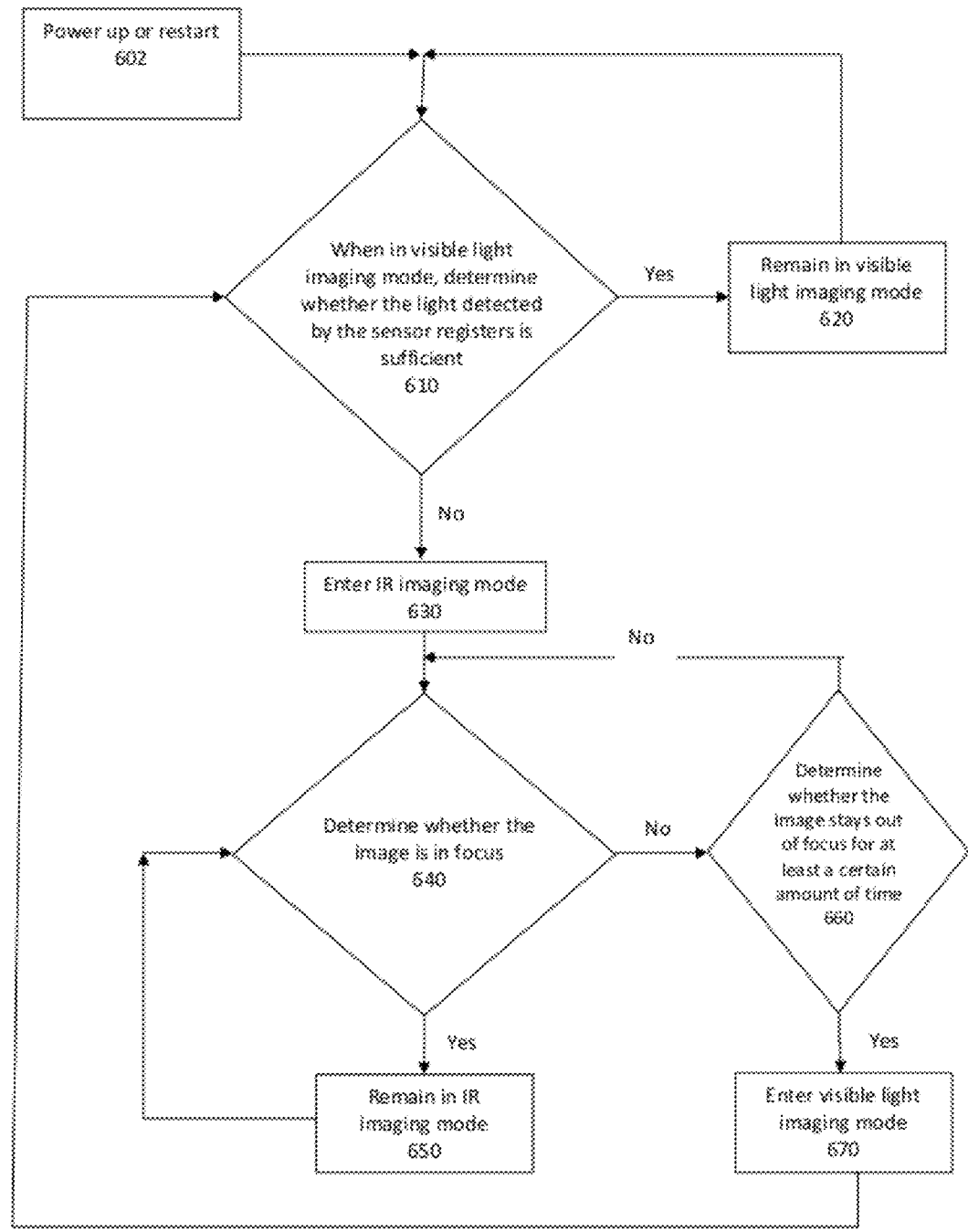
FIG. 6 is a flowchart showing an algorithm in accordance with an embodiment of the present invention.

A flowchart showing such an algorithm in accordance with an embodiment of the present invention is shown in FIG. 6. A camera in accordance with such an embodiment powers up or restarts (step 602) in the visible light imaging mode (or "day mode"). In this mode, the IR filter 120 is in between the sensor and the object/scene being imaged, and is blocking IR light from reaching the sensor. With the IR filter 120 in place it is easy for the sensor (imager) 140 to detect the level of visible light present in the scene. In this visible light imaging mode, the registers of the sensor 140 are read to determine (step 610) whether enough visible light is present. This determination is made, in one embodiment, by comparing the reading of the registers to a (pre-determined) threshold value. If the registers show a value more than the threshold value, it is determined (step 610) that a sufficient amount of visible light is present for the camera to continue functioning in a satisfactory manner, and the camera remains (step 620) in the visible light imaging mode.

If the value read on the registers is less than the threshold value, it is determined (step 610) that the sufficient visible light is not present, and the IR imaging mode (or "night mode") is entered (step 630). The IR filter 120 is removed from in between the sensor and the scene being imaged. In some embodiments, IR light sources 160 are turned on as well. A determination (step 640) now needs to be made as to when sufficient visible light is available to re-enter the visible light imaging mode. This determination is not as simple as the previous one when the camera was in visible light imaging mode. The problem arises because when the camera is in IR imaging mode, and the IR filter 120 is not blocking the IR light, the sensor 140 sees plenty of IR light. Thus, simply querying the registers of the sensor will always result in the determination that plenty of light (IR in this case) is available in the scene. Since IR light is being read, reading these registers provides no indication of whether or not enough visible light is now present in the scene (e.g., because it is morning, because a visible light source (e.g., a light bulb) has been turned on, etc.). Thus the determination of whether to switch back into visible light imaging mode needs to employ a different methodology.

As discussed above, IR light has a longer wavelength than visible light, and therefore IR light and visible light have different focal points. The lens assembly 110 is tuned to create an image in-focus with IR lighting without the IR filter 120, as shown in FIG. 3A. In this IR imaging mode configuration, visible light, having a shorter wavelength, produces an out of focus picture. This is shown in FIG. 3C. (Visible light is in focus with the IR filter 120 in place, because the refractive properties of the IR filter 120 brings the visible light back into focus, as shown in FIG. 3B.) Thus when the camera is in the IR imaging mode, and when sufficient visible light is present in the scene, the image produced becomes out of focus. In one embodiment, this is used to determine (step 640) when sufficient visible light is present. In one embodiment, in order to determine (step 640) whether the image is in focus or not, the system has the capability to determine or measure the focus/sharpness of the scene. In one embodiment, the various optical components in the camera are arranged such that 1. Images captured by the camera are in focus with IR filter 120 in the lens stack and when sufficient visible light is present.
2. Images captured by the camera are in focus without IR filter 120 and mostly IR lighting in the scene.
3. The imager/sensor 140 provides information regarding the level of focus the scene.

Referring back to FIG. 6, if it is determined (step 640) that the image is in focus in the IR imaging mode, then the camera remains (step 650) in the IR imaging mode. In one embodiment, the current focus value is compared to an initial focus value. When this difference is less than a (pre-determined) threshold value, the image is determined to be in focus. (The determination of whether an image is in focus or not is discussed in further detail with reference to FIG. 7). On the other hand, if it is determined that the image is out of focus (e.g., because the difference between the current focus value and the initial focus value is greater than or equal to the threshold value), then in one embodiment, the system continues to check that the image remains out of focus for greater than a certain amount of time. In one embodiment, this certain amount of time is pre-determined. This waiting prevents temporary conditions (such as headlights from a passing car) from putting the camera into visible light imaging mode.

In one embodiment, waiting for a certain amount of time (step 660) after detecting that the image is out of focus is not done. Instead, when the determination (step 540) is made that the image is out of focus, the visible light imaging mode is entered (step 570).

A camera in accordance with an embodiment of the present invention automatically switches from one mode to another based upon such an algorithm. In one embodiment, based upon this algorithm, a user is provided with an indication that the mode of the camera should be switched from one mode to another.

Figure 7:
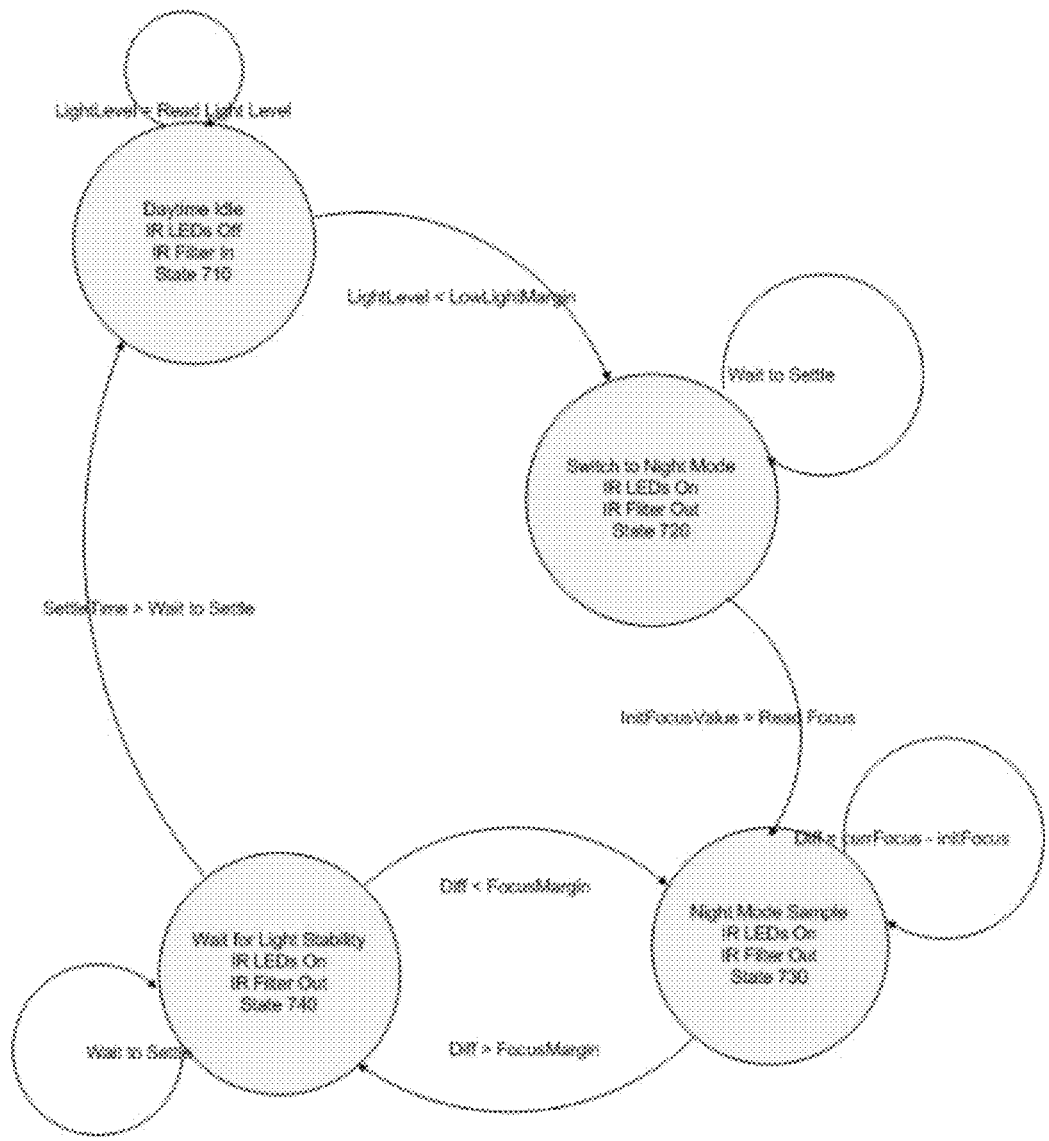
FIG. 7 shows a state diagram representation of an algorithm for switching between visible light imaging mode (or "day mode") and IR imaging mode (or "night mode") in accordance with an embodiment of the present invention.

FIG. 7 shows a state diagram representation of an algorithm for switching between visible light imaging mode (or "day mode") and IR imaging mode (or "night mode") in accordance with an embodiment of the present invention.

Day to Night Mode

Let us start with state 710, where the camera is in day mode. In one embodiment, when the camera powers up it starts up in day-mode, with the IR filter 120 inserted in the lens assembly and the IR light sources (e.g., IR LED illuminators) 160 turned off. The algorithm reads the light level the sensor 140 senses on a periodic basis. With the IR filter 120 in, only the amount of visible light is measured and compared against a light threshold. When the amount of visible light falls below the low light threshold the algorithm will switch to night-mode with the IR LEDs 160 on and IR filter 120 removed from the lens stack. This corresponds to state 720.

Night Mode

Once in night-mode (state 720), the algorithm will wait for several seconds to allow the imager 140 to settle and adjust to the new conditions. After the imager 140 has settled, a reading of the level of focus from the imager is stored in a variable. Let us call this variable initFocus. After night-mode has settled and the initial focus value has been stored, the algorithm moves to the next state, which is state 730. This next state 730 is designed to read the focus value on a periodic basis and performs a difference operation of the current focus value (currFocus) with the initial focus value (initFocus). The difference of currFocus with initFocus is compared to a focus margin (FocusMargin). When the difference is greater than FocusMargin, then the algorithm moves to the next state (state 740). When the focus changes beyond FocusMargin, this indicates that the visible light is increased to the point that the camera may be able to switch out of night-mode.

Night to Day Mode

However, before completely leaving night-mode, it is important to ensure that the light change is a lasting condition, and not a very temporary condition, such as car light passing through the scene. So, in accordance with an embodiment of the present invention, there is a waiting period in this state (740) for several seconds, continuing to read the current focus level and performing the same difference test as in the previous state. If the difference falls below FocusMargin, then return to the Night Mode Sample state (state 730). On the other hand, if the difference remains above FocusMargin for more than the waiting period, then the algorithm sets the current state back to the Daytime Idle state (710). Upon returning to this daytime state (710), the IR LEDs 160 are turned off, and the IR filter 120 is moved in-line with the lens stack. The camera is now in day-mode.

The algorithm discussed above with reference to FIGS. 6 and 7 can be implemented in any component of the system, such as in the camera 100, computers, etc. An example of such a system in accordance with an embodiment of the present invention is discussed below.

Figure 8:
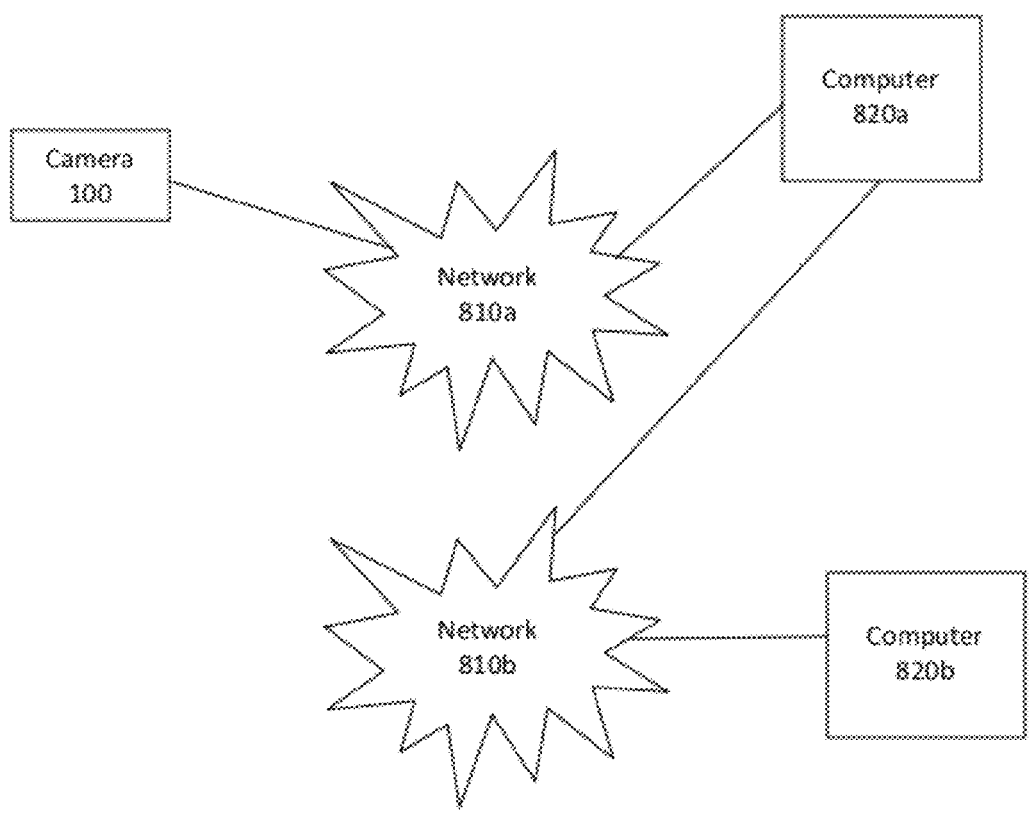
FIG. 8 is a block diagram of a system in accordance with an embodiment of the present invention.

FIG. 8 is a block diagram of a system in accordance with an embodiment of the present invention. It can be seen that such a system includes camera(s) 100, networks 810 and computers 820.

Instead of a single camera 100, there may be multiple cameras 100 connected to one or more computers 810 and/or networks 820. For example, more than one camera 100 may communicate with computer 810a. Camera 100 can be any kind of image capture device. Such a device may capture video alone, still images alone, or both. Additionally, such a camera may also capture audio. Further, such a camera can be a stand-alone device, or a device that is part of another device such as a smart phone, a cell phone, a personal digital assistant (PDA), a laptop, a tablet, a set-top box, a remote control, and so on. As an example, camera 100 may be video surveillance camera. As another example, camera 100 may be a webcam. In one embodiment, the camera 100 is physically integrated into and/or is part of computer 810a.

The networks 810a and 810b (collectively referred to as "810") can be any network, such as a Wide Area Network (WAN) or a Local Area Network (LAN), or any other network. A WAN may include the Internet, the Internet 2, and the like. A LAN may include an Intranet, which may be a network based on, for example, TCP/IP belonging to an organization accessible only by the organization's members, employees, or others with authorization. A LAN may also be a network such as, for example, Netware™ from Novell Corporation (Provo, Utah) or Windows NT from Microsoft Corporation (Redmond, Wash.). The network 810 may be a home network, may be wired or wireless, may be based on Ethernet, WiFi, over a cellular network, over power lines, via satellite, and so on. The network 810 may also include commercially available subscription-based services such as, for example, AOL from America Online, Inc. (Dulles, Va.) or MSN from Microsoft Corporation (Redmond, Wash.). It is to be noted that the camera 100 may communicate with computer 820 without a network. For instance, the camera 100 may communicate with the computer 810 using Infra Red (IR) protocol, a BlueTooth protocol (BT), a USB protocol, a firewire protocol, and so on. It is to be noted that the present invention is independent of the specific network(s) and protocol(s) used. Moreover, it is possible that the camera is actually embedded into the computer 820, and thus comprises a single physical device rather than two separate devices as shown in FIG. 8. As shown in FIG. 8, in one embodiment, there are two networks or protocols—a first one over which the camera 100 communicates with a computer 820 which is located proximate to the camera 100, and a second network (e.g., the Internet) over which the computer 820a communicates with another computer 820b. In one embodiment, the camera 100 communicates with the computer 820b via the computer 820a. In another embodiment, the camera 100 communicates with the computer 820b directly over network 810b.

The computers 820a and 820b (collectively referred to as "820") can each be any of various devices. Such devices can include, but are not limited to, personal computers (Windows based, Macs, etc.), smart phones (e.g., iphones etc.), laptops, tablets, set-top boxes, remote servers, and so on. In one embodiment, computer 820b is a remote server on which data from various differently located cameras 100 can be aggregated and analyzed. In one embodiment, computer 820b is a smartphone. In one embodiment, computer 820a is a user's personal desktop or laptop computer. It is to be noted that computers 820 can be any device capable of performing the needed processing/rendering etc. functions.

For example, in one embodiment, camera 100 communicates with a user's computer 820a over home power lines 810a, and the user's computer 820a can in turn communicate with a remote computer 820b over the internet 810b or cellular network 810b. In one embodiment, cameras 100 capture video (e.g., surveillance video), and display it on a smartphone 820b. In one embodiment, camera 810a is used to have a video based communication (e.g., video chat) with a second user using computer 820b (who may have a second camera to capture his/her video).

While particular embodiments and applications of the present invention have been illustrated and described, it is to be understood that the invention is not limited to the precise construction and components disclosed herein. For example, different functionalities of the present invention can be in different parts of the system. For instance, the processor running the algorithm for determining whether to switch from one mode to another can be located in the camera itself, or in a remote processor in one of the computers. For instance, the processor running this algorithm may be in a local computer, a remote server, a smartphone, a tablet, etc. As another example, several of these functionalities may be implemented in software, firmware, hardware, or as any combination of these. As still another example, any of the techniques described herein can be combined with each other without limitation, and/or may be combined with other known techniques, such as increasing exposure time to account for low lighting conditions. Furthermore, a camera in accordance with embodiments of the present invention may be used in various contexts apart from those suggested above. Various other modifications, changes, and variations which will be apparent to those skilled in the art may be made in the arrangement, operation and details of the method and apparatus of the present invention disclosed herein, without departing from the spirit and scope of the invention as defined in the following claims.

What is claimed is:

1. An image capturing apparatus comprising:
   a frame having an aperture;
   a lens for collecting light allowed through by the aperture;
   a sensor for receiving the collected light; and
   an infra-red filter coupled to the frame, the infra-red filter for blocking out infra-red light, the infra-red filter being movable from a first position to a second position, wherein in the first position the infra-red filter is in an optical path between the lens and the sensor so as to not allow infra-red light to reach the sensor from the lens, and in the second position, the infra-red filter is not in the optical path between the lens and the sensor so as to allow infra-red light to reach the sensor from the lens,
   wherein the lens and the infra-red filter are configured such that visible light leaving the infra-red filter focuses directly on the sensor with the infra-red filter in the first position, and infra-red light leaving the lens focuses directly on the sensor with the infra-red filter in the second position, and
   wherein a distance between the lens and the sensor is such that the infra-red light leaving the lens is focused directly on the sensor without use of an interceding lens or filter and a thickness of the infra-red filter is such that the visible light leaving the infra-red filter is focused directly on the sensor when the infra-red filter is in the first position.

2. The image capturing apparatus of claim 1, wherein the infra-red filter is mounted on a swinging arm, the swinging arm being rotatably coupled to the frame.

3. The image capturing apparatus of claim 1, wherein the image capturing apparatus is a camera.

4. The image capturing apparatus of claim 3, wherein the camera is a video surveillance camera.

5. The image capturing apparatus of claim 3, wherein the camera is a webcam.

6. The image capturing apparatus of claim 1, further comprising an infra-red light source.

7. The image capturing apparatus of claim 6, wherein the infra-red light source is an infra-red LED.

8. The image capturing apparatus of claim 6, wherein the wavelength of the infra-red light source is chosen to focus infra-red light on the sensor with the infra-red filter in the second position.

9. The image capturing apparatus of claim 1, wherein the camera has a first mode in which the infra-red sensor is in the first position, and a second mode in which the infra-red sensor is in the second position.

10. The image capturing apparatus of claim 9, wherein in the second mode an infra-red light source is turned on.

11. A method for capturing images using infra-red light or visible light as appropriate, the method comprising:
    determining, in a first mode, whether a sufficient amount of visible light is present to capture an acceptable quality image;
    in response to the determination that a sufficient amount of visible light is present, remaining in the first mode, wherein an image is captured on a sensor using visible light;
    in response to the determination that a sufficient amount of visible light is not present,
    switching to a second mode, wherein an image is captured on the sensor using non-visible radiation;
    in the second mode, determining if a sufficient amount of visible light is present; and
    in response to the determination that a sufficient amount of visible light is present when in the second mode, switching to the first mode,
    wherein the step of switching to the second mode includes removing an infra-red filter from in front of the sensor, so as to allow infra-red light to reach the sensor, and
    wherein the step of in the second mode, determining if a sufficient amount of visible light is present comprises:
    comparing a focus value of the image to an initial focus value; and
    in response to the focus value being different from the initial value by more than a threshold value, determining that the image is out of focus.

12. The method of claim 11, wherein the non-visible radiation is infra-red light.

13. The method of claim 1, further comprising:
    turning on an infra-red light source.

14. The method of claim 12 wherein the step of switching to the first mode comprises:
    positioning an infra-red filter in front of the sensor, wherein the infra-red filter blocks infra-red light from reaching the sensor.

15. The method of claim 14, further comprising:
    turning off an infra-red light source.

16. The method of claim 11, wherein the step of determining, in the first mode, whether a sufficient amount of visible light is present to capture an acceptable quality image comprises:
   reading the registers of the sensor to determine whether the amount of light registered is higher than a threshold value.

17. The method of claim 11, further comprising:
   in response to the to the focus value being different from the initial value by less than a threshold value, determining that the image is in focus.

18. The method of claim 11, further comprising:
   for a pre-determined amount of time, checking whether the image remains out of focus.

19. A non-transitory computer-readable medium including instructions for a computer to implement a method, the method comprising:
   determining, in a first mode, whether a sufficient amount of visible light is present to capture an acceptable quality image;
   in response to the determination that a sufficient amount of visible light is present, remaining in the first mode, wherein an image is captured on a sensor using visible light;
   in response to the determination that a sufficient amount of visible light is not present, switching to a second mode, wherein an image is captured on the sensor using non-visible radiation;
   in the second mode, determining if a sufficient amount of visible light is present; and
   in response to the determination that a sufficient amount of visible light is present when in the second mode, switching to the first mode,
   wherein the step of in the second mode, determining if a sufficient amount of visible light is present comprises:
   comparing a focus value of the image to an initial focus value; and
   in response to the focus value being different from the initial value by more than a threshold value, determining that the image is out of focus.

* * * * *